United States Patent
Goh et al.

(10) Patent No.: US 6,519,106 B1
(45) Date of Patent: Feb. 11, 2003

(54) METHOD AND APPARATUS FOR CORRECTING DIGITAL ASYMMETRIC READ SIGNALS

(75) Inventors: Nan Ling Goh, Singapore (SG); Ban Hok Goh, Singapore (SG); Utt Heng Kan, Singapore (SG); Kah Liang Gan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/553,073

(22) Filed: Apr. 20, 2000

Related U.S. Application Data

(60) Provisional application No. 60/130,312, filed on Apr. 21, 1999.

(51) Int. Cl.[7] .............................................. G11B 5/35
(52) U.S. Cl. ............................ 360/65; 360/66; 360/25
(58) Field of Search .............................. 360/65, 46, 31, 360/25, 66

(56) References Cited

U.S. PATENT DOCUMENTS

| | | | |
|---|---|---|---|
| 4,945,538 A | 7/1990 | Patel | 371/43 |
| 5,418,660 A | 5/1995 | Sato et al. | 360/65 |
| 5,455,813 A | 10/1995 | Hayashi | 369/59 |
| 5,744,993 A | 4/1998 | Sonntag | 327/307 |
| 5,872,668 A | 2/1999 | Muto | 360/65 |
| 5,943,177 A | 8/1999 | Mathews et al. | 360/65 |
| 5,970,091 A | * 10/1999 | Nishida et al. | 375/231 |
| 6,141,167 A | * 10/2000 | Nishida et al. | 360/46 |

FOREIGN PATENT DOCUMENTS

| | | |
|---|---|---|
| EP | 0 766 244 A2 | 4/1997 |
| WO | WO 96/18189 | 6/1996 |
| WO | WO 96/37882 | 11/1996 |

\* cited by examiner

*Primary Examiner*—David Hudspeth
*Assistant Examiner*—Varsha A. Kapadia
(74) *Attorney, Agent, or Firm*—Westman, Champlin & Kelly

(57) ABSTRACT

A method for compensating digital samples of an asymmetric read signal is presented. The method involves reading a digital sample of an asymmetric read signal V(t) (160), generating a compensated sample at least when the digital sample requires compensation (164), and outputting either the digital sample (168) or the compensated sample (166). Also presented is an asymmetry correction block (158) of a read channel (144) of a disc drive (110) that includes an input (200), a level detector (202), a compensator (204), and an output (208). The level detector (202) and the compensator (204) receive the digital sample through the input (200). The level detector (202) determines whether the digital sample requires compensation. The compensator (204) generates a compensated sample at least when the digital sample requires compensation. The output (208) selectively outputs either the digital sample or the compensated sample.

16 Claims, 5 Drawing Sheets

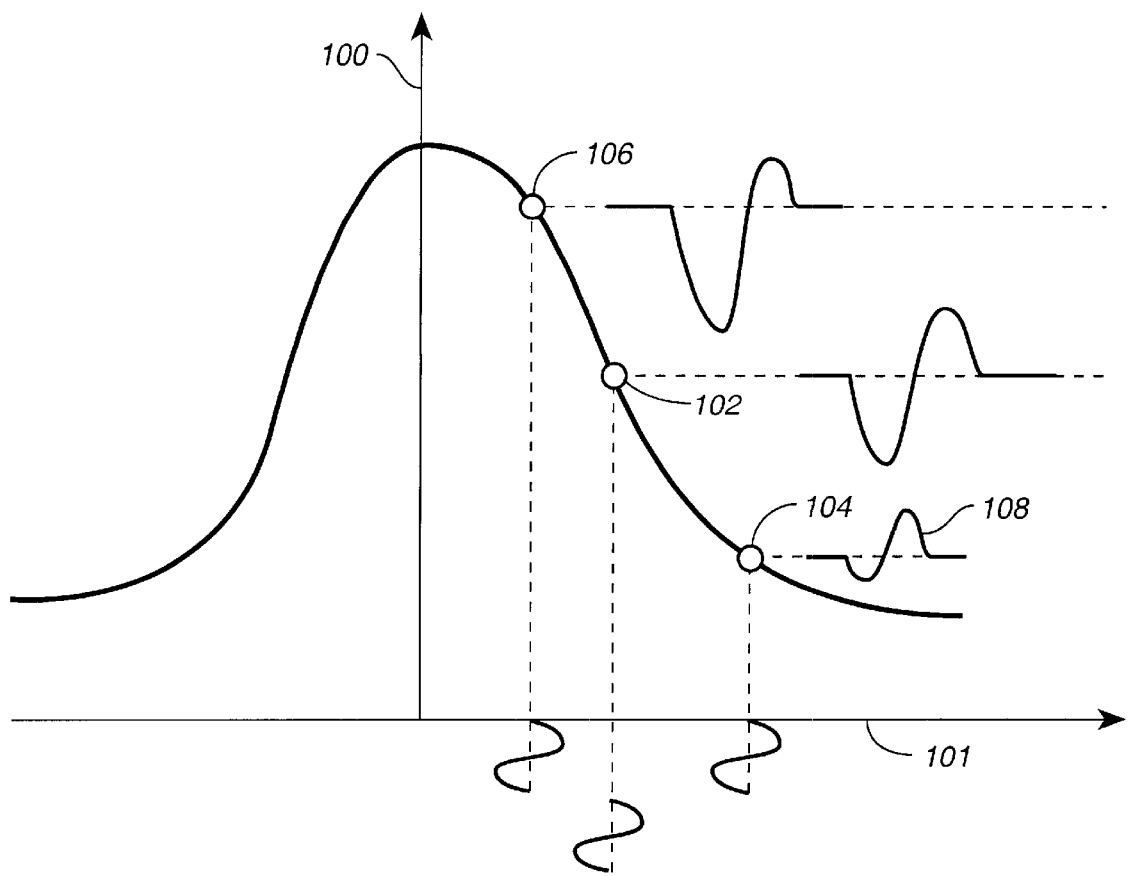
FIG._1
*(PRIOR ART)*

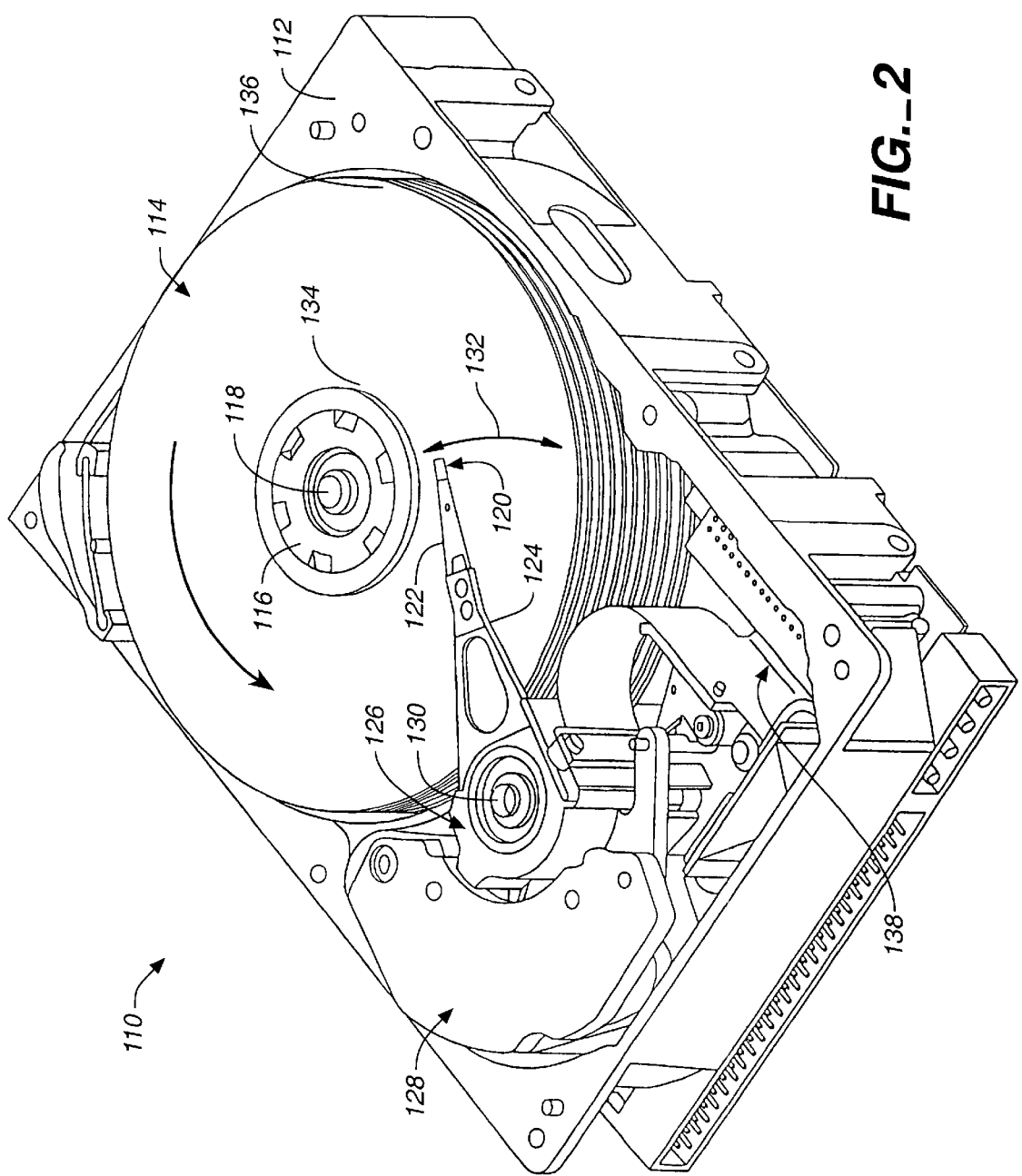

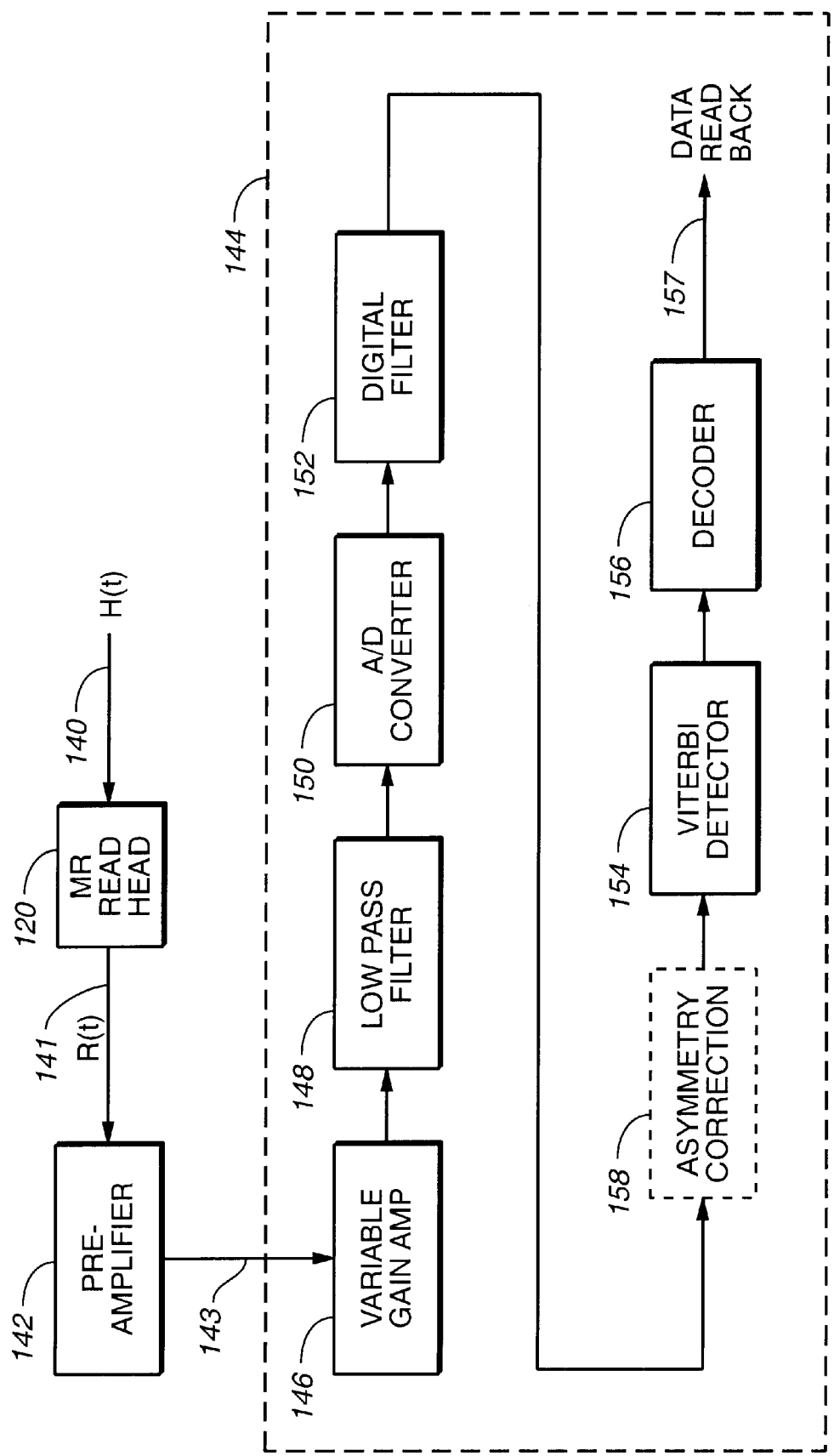
FIG._3

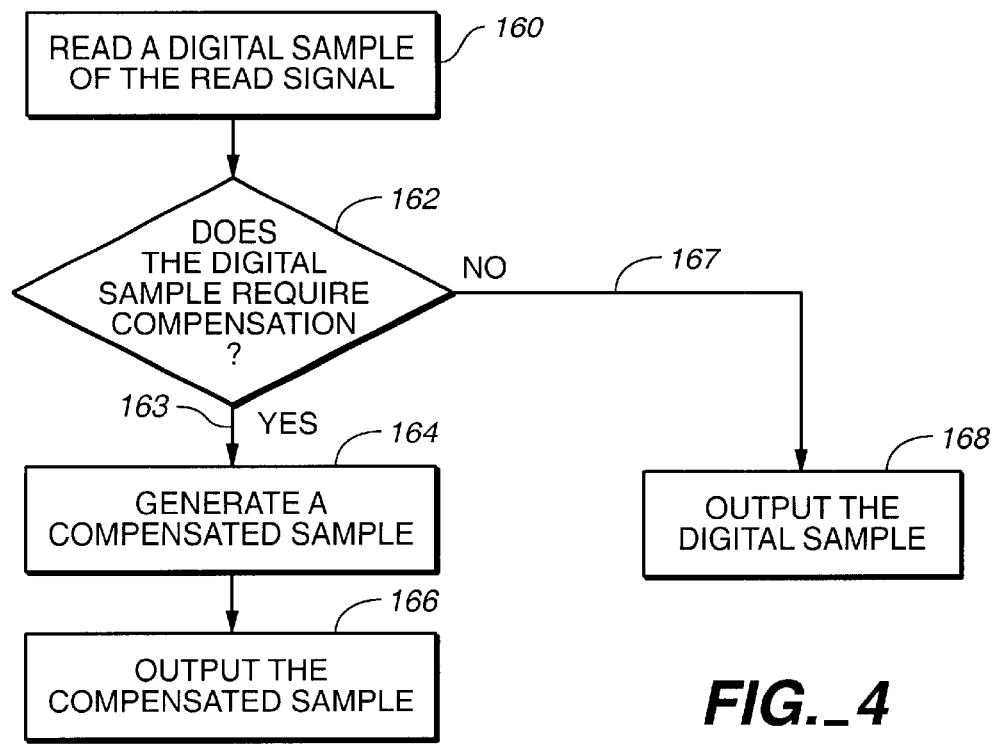
FIG._4
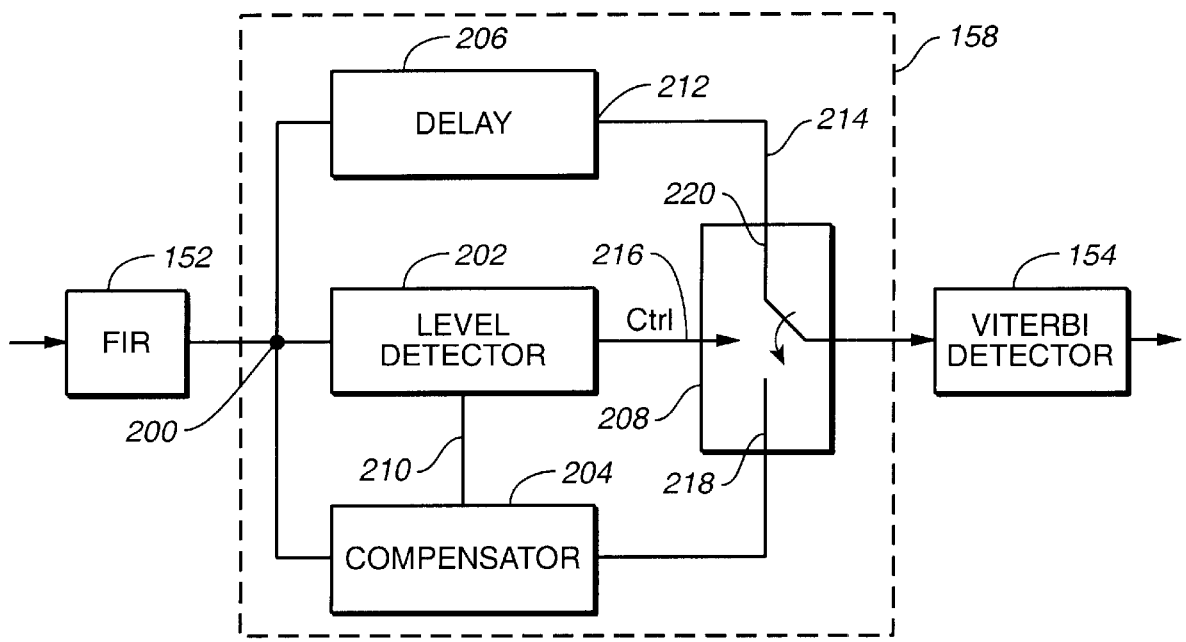
FIG._6

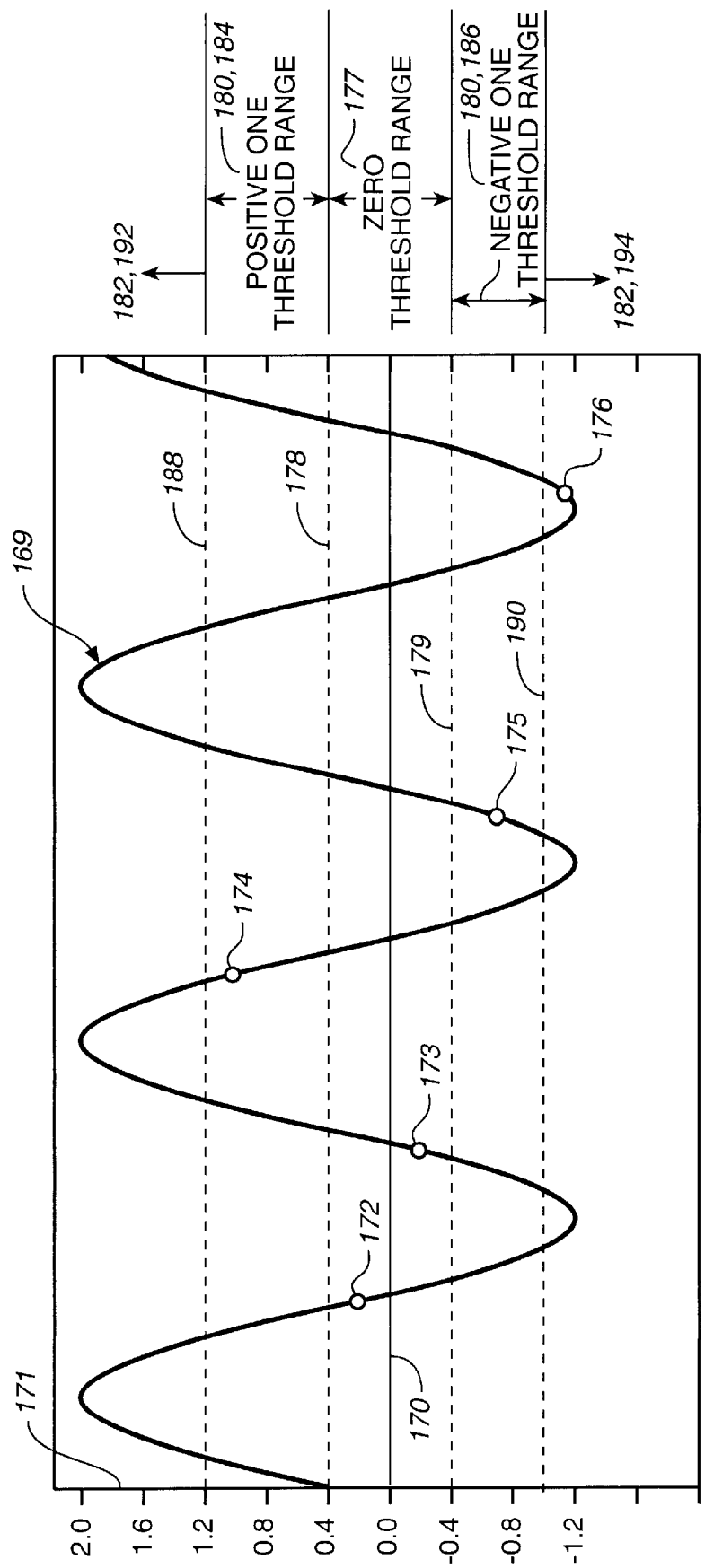
FIG._5

METHOD AND APPARATUS FOR CORRECTING DIGITAL ASYMMETRIC READ SIGNALS

CROSS-REFERENCE TO RELATED APPLICATION

The present application claims the benefit of U.S. Provisional Application having Ser. No. 60/130,312, filed on Apr. 21, 1999 and entitled "DIGITAL ASYMMETRY CORRECTION METHOD".

FIELD OF THE INVENTION

The present invention relates to a method and apparatus for correcting the asymmetry of digital signals and, more specifically, digital read signals in a read channel of a disc drive.

BACKGROUND OF THE INVENTION

Use of magnetic media for mass storage of digital data in a computer system is widespread. Digital data is generally stored on a magnetic medium in the form of magnetic polarity inversions induced into the surface of the medium. If the medium is a magnetic disc, for example, the data is usually arranged in a series of concentric annuluses on the disc's surface, known as tracks. To read data from one of these tracks, the disc is rotated at a constant speed, and a magnetic transducer is brought near the rotating track to convert the alternating magnetic field emanating from the track surface into an analog electrical signal. One type of magnetic transducer, which is widely used for reading digital data from a magnetic medium, is a magneto-resistive (MR) head.

An MR head is a device whose resistance varies with the applied magnetic field. In this regard, the head is capable of converting magnetic field variations produced by a rotating track into a time varying voltage or current in an electrical circuit. MR heads offer many advantages over other types of magnetic transducers and, consequently, are increasingly being used in magnetic data storage systems. For example, MR heads are more sensitive than other types of read heads, such as thin film heads, and produce a stronger read signal. Also, MR heads have a better frequency response than other types of heads which use inductive coils as a sensing means. In addition, the read signal produced by an MR head is relatively insensitive to the relative velocity between the head and the medium, as is the case with other types of heads, because it is the level of the applied magnetic field which is sensed by an MR head and not the rate of change of magnetic flux lines through a coil. This is an advantage in systems where head/medium velocity may vary over a significant range. Lastly, because MR heads are not capable of writing data on a magnetic medium, magnetic data storage systems which use MR read heads must include a separate head to perform the write function. Using a separate head for reading and writing allows each head to be separately optimized for performing its singular task which can greatly improve the performance of a magnetic data storage system.

As illustrated in FIG. 1, the relationship between the resistance, represented by the y-axis 100, of an MR head and the applied magnetic field, represented by the x-axis 101, is nonlinear. This nonlinear characteristic can produce problems in the conversion of the magnetic field variations emanating from the medium into the time varying electrical signal. For example, the nonlinear nature of the MR head may cause the time varying read signal produced by the MR head to look nothing like the magnetic signal applied to the head. To overcome this problem, a bias current is generally applied to the head to move the quiescent operating point of the head to a more linear region of the resistance characteristic. With reference to FIG. 1, it is seen that maximum linearity in the operation of an MR head is obtained by biasing the head at point 102, i.e., the most linear point on the characteristic. It may be desirable, however, to bias the head at another point, such as point 104 or point 106, to maximize a conversion parameter which may be more important than linearity, such as signal to noise ratio (SNR). As a consequence of such biasing, the output signal of the head may be asymmetrical about a zero volt baseline, such as output waveform 108 in FIG. 1 corresponding to bias point 104. In addition to biasing effects, other factors may also exist which result in an asymmetrical read signal, such as off-track effects.

In a disc drive using a partial response maximum likelihood (PRML) channel, the MR head is typically biased such that its output is asymmetric about a zero volt baseline. The difference in the magnitudes of the positive and negative peaks of the read signal complicates the sampling of the signal which must be performed before maximum-likelihood detection can occur. The asymmetry of the read signal leads to a higher mean square error in the detection stage of the PRML channel resulting in a higher error rate. As a result, it is advantageous to correct the asymmetry of a read signal prior to the detection stage of the PRML channel.

The amount of asymmetry of the read signal can be defined as the ratio of the larger peak magnitude of one polarity to the smaller peak magnitude of the other polarity. For example, the amount of asymmetry of the read signal of FIG. 1 would be approximately 1.2–0.7 resulting in an asymmetry of 1.7 (1.2÷0.7).

U.S. Pat. No. 5,744,993 (Sonntag) uses a technique called "nonlinearity cancellation" to compensate an asymmetric read signal. This non-linearity cancellation method believes that the asymmetric signal is a combination of the fundamental and second order of the input signal, and to get rid of the asymmetry, the second order of the input signal is removed. However, this method is only effective when the assumption that the asymmetry can be modeled by the second order of the signal is true. Furthermore, when the asymmetry is large enough such that the noise becomes significant, this method becomes ineffective. Currently, the maximum asymmetry that can be compensated using this method is approximately 1.5 or 150%.

The need therefore exists for a method and apparatus which are capable of overcoming the above-mentioned problems to compensate or correct an asymmetric read signal that is produced by an MR head.

SUMMARY OF THE INVENTION

The present invention relates correcting or compensating an asymmetric read signal in a read channel of a disc drive.

One embodiment of the invention is directed to a method of correcting digital samples of an asymmetric read signal. In accordance with this embodiment, a digital sample of the asymmetric read signal is read and a determination is made as to whether the digital sample requires compensation. If the digital sample requires compensation, a compensated sample can be generated. Finally, either the compensated sample or the digital sample can be outputted.

Another embodiment of the present invention is directed to an asymmetry correction block that is capable of implementing the above-mentioned method. One embodiment of the asymmetry correction block includes an input, a level detector, a compensator, and an output. The input receives a digital sample of the asymmetric read signal and provides the digital sample to the level detector and the compensator. The level detector determines whether the digital sample requires compensation. If it is determined that the digital sample requires compensation, the compensator generates a compensated sample. The output is configured to selectively output either the digital sample or the compensated sample. In one embodiment of the invention, the asymmetry correction block further includes a delay circuit. The delay circuit receives the digital sample from the input and delays providing it to the output to ensure proper synchronization with the compensator.

These and various other features as well as advantages which characterize the present invention will be apparent upon reading of the following detailed description and review of the associated drawings.

BRIEF DESCRIPTION OF THE DRAWINGS

FIG. 1 is a graph illustrating a typical resistance characteristic for a magneto-resistive read head.

FIG. 2 is a perspective view of a disc drive in which embodiments of the present invention can be used.

FIG. 3 is a block diagram illustrating a PRML data channel in which embodiments of the present invention can be used.

FIG. 4 is a flowchart illustrating an embodiment of the invention.

FIG. 5 is a plot of an example of an asymmetric read signal.

FIG. 6 is a block diagram of an asymmetry correction block in accordance with one embodiment of the invention.

DETAILED DESCRIPTION OF ILLUSTRATIVE EMBODIMENTS

FIG. 2 is a perspective view of a disc drive 110 in which the present invention is useful. Disc drive 110 includes a housing with a base 112 and a top cover (not shown). Disc drive 110 further includes a disc pack 114, which is mounted on a spindle motor (not shown) by a disc clamp 116. Disc pack 114 includes a plurality of individual discs which are mounted for co-rotation about central axis 118. Each disc surface has an associated head 120 which is mounted to disc drive 110 for communication with the disc surface. In the example shown in FIG. 2, heads 120 are supported by suspensions 122 which are in turn attached to track accessing arms 124 of an actuator 126. The actuator 126, shown in FIG. 2, is of the type known as a rotary moving coil actuator and includes a voice coil motor (VCM), shown generally at 128. Voice coil motor 128 rotates actuator 126 with its attached heads 120 about a pivot shaft 130 to position heads 120 over a desired data track along a path 132 between a disc inner diameter 134 and a disc outer diameter 136. Voice coil motor operates under control of internal circuitry 138. Write circuitry within internal circuitry 138 encodes the data to be stored into successive code words and sends the code words in the form of a serial analog write signal to the write transducer on head 120 which encodes magnetic flux reversals within a magnetic layer on the disc surface.

One embodiment of the transducer in head 120 is a magneto-resistive (MR) head 120, which, during read operations, senses the magnetic flux reversals and generates a serial analog read signal. FIG. 3 is a block diagram of a typical path of the read signal. MR read head 120 receives the read signal in the form of a magnetic field strength signal H(t), indicated by line 140, from the magnetic surface of a disc of disc drive 110. In response to magnetic field strength signal H(t) (140), MR read head 120 transmits a read signal in the form of a resistance R(t), indicated by line 141, that is received by preamplifier 142. Preamplifier 142 converts the resistance signal R(t) (141) into a voltage signal, designated as v(t) and indicated by line 143. Preamplifier 142 then provides the voltage signal v(t) to read channel 144, in which, embodiments of the present invention can be used.

Read channel 144 is generally configured to perform a partial response maximum likelihood (PRML) approach to detecting and decoding data read from the storage medium. Read channel 144 can be an Enhanced Partial Response Type Four (EPR4) read channel, or other types of read channels such as PR4 and $E^2$PR4 read channels. The typical components of read channel 144 include a variable gain amplifier (VGA) 146, a low pass filter 148, an analog-to-digital (A/D) converter 150, a digital filter 152, a Viterbi detector 154, and a decoder 156. VGA 146 receives the read signal, in the form of a time-varying voltage signal v(t), from preamplifier 142, and produces an amplified read signal V(t) in accordance with the tolerances of A\D converter 150, and transfers the read signal V(t) to low pass filter 148. The filtered read signal V(t) is then sampled by A/D converter 150 that provides, for example, 32 possible 5-bit sampled values or 64 possible 6-bit sampled values. These samples are then passed through digital filter 152, which can be a 10-tap finite impulse response (FIR) digital filter, to fit the samples to the desired channel response. These samples are then applied to Viterbi detector 154 which generates encoded data that can be decoded by decoder 156 to complete the maximum likelihood detection process for data read back by providing a read data signal indicated by line 157.

Each of the digital samples produced by A/D converter 150 have a magnitude or level that is indicative of a value. For the EPR4 read channel, the levels typically represent the values 0, 1, and 2. For example, a digital sample having a level that is within a zero threshold range can be indicative of the value 0, a level that is within a first threshold range can be indicative of the value 1, and a level that is within a second threshold range can be indicative of the value 2. Typically, these values are interpreted by Viterbi detector 154. One problem associated with a read signal that is asymmetric about its positive and negative polarities is that it becomes difficult to correctly assess the value of the digital sample that is intended. Consequently, it is important the asymmetry of the read signal be corrected prior to application of the read signal to the Viterbi detector 154. The present invention provides such compensation or correction by adjusting level of some of the digital samples of the asymmetric read signal V(t) prior to Viterbi detector 154 using an asymmetry correction block 158, shown as a dashed block in FIG. 3. Asymmetry correction block 158 can perform this asymmetry correction using various methods.

FIG. 4 shows a flowchart of the general method for correcting an asymmetric read signal, in accordance with one embodiment of asymmetry correction block 158. In step 160, asymmetry correction block 158 reads a digital sample of the read signal and, in step 162, determines whether the digital sample requires compensation. If it is determined that the digital sample requires compensation, then line 163 is followed and a compensated sample is generated in step 164. The compensated sample can then be outputted to Viterbi detector 154 at step 166. If it is determined in step 162 that no compensation is needed, then line 167 is followed and the digital sample can be outputted to Viterbi detector 154 after some delay, as indicated in step 168.

As mentioned above, the read signal V(t) has a positive polarity and a negative polarity. When the read signal V(t) is asymmetric, either the positive peak magnitude is smaller than the negative peak magnitude or the negative peak magnitude is smaller than the positive peak magnitude. In one embodiment of the invention, step 162 involves a two step process of first, determining whether the polarity of the digital sample corresponds to a polarity of the read signal that requires compensation, and second, determining whether the digital sample has a level that is within a zero threshold range. For this embodiment of step 162, a digital sample will require compensation when the polarity of the digital sample corresponds to the polarity that requires compensation and the level of the digital sample is not within the zero threshold range.

In one embodiment, the polarity of the read signal V(t) that requires compensation is the polarity having the smaller peak magnitude. FIG. 5 shows a plot of an example of an asymmetric read signal V(t), designated as waveform 169, where the x-axis 170 represents time and the y-axis 171 represents the magnitude of the read signal V(t). Points 172, 173, 174, 175, and 176 represent various locations where read signal V(t) could be sampled by A/D converter 150. For this example, the negative polarity would be chosen as the polarity that requires compensation since it contains the smaller peak magnitude. As a result, digital samples of read signal V(t) taken at points 173, 175, and 176 would have polarities that correspond to the polarity that requires compensation.

One embodiment of a zero threshold range 177, of read signal V(t), has a positive zero threshold limit 178 and a negative zero threshold limit 179, as shown in the example of FIG. 5. Both positive zero threshold limit 178 and negative zero threshold limit 179 are shown to have the same magnitude, however, they could be different. Generally, the best settings of positive zero threshold limit 178 and negative zero threshold limit 179 are determined experimentally. Only digital samples of read signal V(t) taken at points 172 and 173 would have levels that are within zero threshold range 177 and, thus, do not require compensation. However, digital samples of read signal V(t) taken at points 175 and 176 would each have a polarity that corresponds to the polarity that requires compensation and each would have a level that is not within zero threshold range 177. Consequently, digital samples of read signal V(t) taken at points 175 and 176 would be determined to require compensation in this embodiment of step 162.

As mentioned above, in step 164 a compensated sample is generated when it is determined in step 162 that the digital sample requires compensation. The compensated sample results from correcting or compensating the digital sample of the asymmetric read signal V(t) such that the level of the compensated sample resembles the level a digital sample would have had if the read signal V(t) had been symmetric. In this embodiment, the compensated sample is generated by offsetting the level of the digital sample by an offset value such that the level is increased. For the example shown in FIG. 5, if the offset value was set to 0.4 a digital sample of asymmetric read signal V(t) taken at point 175, which has a level of −0.7, would be increased by the offset value to a higher magnitude of −1.1 by subtracting the offset value from the level of the digital sample. Similarly, if the polarity that requires compensation is the positive polarity and it is determined that a digital sample requires compensation, the level of the digital sample will be increased by adding the offset value to the level of the digital sample.

One embodiment of the offset value includes a first offset value and a second offset value. The first offset value is used to compensate or correct digital samples that have levels that are within a first threshold range 180. The second offset value is used to compensate or correct digital samples that have levels that are within a second threshold range 182. The first and second offset values can be different values that are generally optimized experimentally for a particular disc drive or type of disc drive. The determination is made in step 162 as to whether the level of the digital sample falls within the first threshold range 180 or the second threshold range 182.

Referring again to the example in FIG. 5, first threshold range 180 can have a positive first threshold range 184 and a negative first threshold range 186. Generally, the positive first threshold range 184 extends from positive zero threshold limit 178 to a positive first threshold limit 188 and the negative first threshold limit 186 extends from the negative zero threshold limit 179 to a negative first threshold limit 190. The position of the threshold limits, 179, 178, 188, and 190 are typically chosen based upon experimental results. Similarly, second threshold range 182 can have a positive second threshold range 192 and a negative second threshold range 194. Positive second threshold range 192 extends in the positive direction from positive first threshold limit 188 and negative second threshold range 194 extends in the negative direction from the negative first threshold limit 190.

For the example shown in FIG. 5, when the digital sample of read signal V(t) is taken at point 175 its level is within negative first threshold range 186 and, in accordance with this embodiment of the invention, it will be offset with the first offset value. When the digital sample of read signal V(t) is taken at point 176 its level is within negative second threshold range 194 and, thus, will be offset by the second offset value.

If the digital sample does not require compensation, then the digital sample is outputted to Viterbi detector 154 after a suitable delay, as indicated at step 168 of FIG. 4. If the digital sample requires compensation, then the compensated sample is generated in step 164, and the compensated sample is outputted to Viterbi detector 154 at step 166.

In another embodiment of the invention, the polarity of the read signal that requires compensation is chosen to be the polarity having the larger peak magnitude. Thus, for the example shown in FIG. 5, the digital sample of read signal V(t) taken at points 172 and 174 would have a polarity which corresponds to the polarity that requires compensation. As in step 164 of the previous embodiment, the digital samples that require compensation are offset by an offset value to produce a compensated sample. However, rather than increasing the level of the digital sample by the offset value, the level of the digital sample will be decreased by the offset value thereby reducing the magnitude of the digital sample such that it more closely resembles a digital sample of a symmetric read signal V(t). In addition, this embodiment can utilize a first offset value when the digital sample is within the first threshold range 180 and a second offset value when the digital sample is within a second threshold range 182, as in the previous embodiment.

In another embodiment of the invention, rather than choosing a polarity that requires compensation, all of the digital samples having levels that are not within zero threshold range 177 will be determined to require compensation in step 162, shown in the flowchart of FIG. 4. In this embodiment, the polarity of either the larger or the smaller peak amplitudes is determined in step 162. Next, as in the other embodiments, when a digital sample requires compensation a compensated sample is generated in step 164. If the digital sample has a polarity corresponding to the polarity of the read signal V(t) containing the larger peak magnitude, the compensated sample is generated by decreasing the level of the digital sample by an offset value. If the digital sample has a polarity corresponding to the polarity of the read signal V(t) containing the smaller peak magnitude, the compensated sample is generated by increasing the level of the digital sample by the offset value. In this manner, the asymmetry of the digitized read signal can be compensated using smaller offset values than the methods discussed above. In addition, the offset values used to generate the compensated sample could be different for different levels of the digital sample as discussed above.

FIG. 6 shows one embodiment of asymmetry correction block 158 of read channel 144 that is capable of implementing the above-described methods for correcting asymmetric read signal V(t). As discussed above, asymmetric read signal V(t) has a polarity that requires compensation; either the polarity having the smaller peak magnitude or the polarity having the larger peak magnitude depending on how the digital sample is to be compensated. Asymmetry correction block 158 generally includes an input 200, a level detector 202, a compensator 204, a delay circuit 206, and an output 208. A processor (not shown) is used to control the components of asymmetry correction block 158 and to perform the various functions of the components of asymmetry block 158.

Input 200 is generally configured to receive a digital sample of asymmetric read signal V(t) from digital filter 152. Level detector 202 is electronically coupled to input 200 and is generally configured to perform the step of determining whether the digital sample requires compensation. Level detector 202 is set to detect digital samples having the polarity that corresponds to the polarity of read signal V(t) that requires compensation. In addition, level detector 202 compares the level of the digital sample to a zero threshold range 177 using a suitable comparator. The zero threshold level range 177 can be adjusted to optimize the asymmetry correction and the performance of read channel 144. If the level of the digital sample is not within the zero threshold range 177 and the polarity of the digital sample corresponds or matches the polarity of read signal V(t) that requires compensation, then level detector 202 will determine that the digital sample requires compensation.

One embodiment of compensator 204 is configured to implement step 164, shown in FIG. 4, by generating a compensated signal at least when the digital sample is determined by level detector 202 to require compensation. Compensator 204 is electrically coupled to input 200 such that it can receive the digital sample being analyzed by level detector 202. In one embodiment, compensator 204 is configured to generate the compensated sample by offsetting level of the digital sample by an offset value. Compensator 204 includes a setting that determines whether compensator 204 will increase or decrease the level of the digital sample by the offset value. This is set according to the choice of the polarity of read signal V(t) that requires compensation. If the polarity of read signal V(t) that requires compensation contains the smaller peak magnitude, then the level of the digital sample will be increased by the offset value. If the polarity of read signal V(t) that requires compensation contains the larger peak magnitude, then the level of the digital sample will be decreased by the offset value. The compensated sample generated by compensator 204 is provided to output 208 through connection 218.

In one embodiment, compensator 204 is configured to offset the level of each digital sample received from input 200 by the offset value regardless of whether the digital sample requires compensation. In another embodiment, level detector 202 can control the generation of compensated samples by compensator 204 using communication link 210. As a result, compensator 204 can be instructed to generate a compensated sample only when level detector 202 determines that the digital sample requires compensation. In another embodiment, level detector 202 is further configured to determine whether the level of the digital sample is within a first threshold range 180 or a second threshold range 182. Examples of first and second threshold ranges 180, 182 are shown in FIG. 5. In this embodiment, level detector 202 can provide compensator 204 with the range 180 or 182 in which the level of the digital sample is positioned through communication link 210. If the digital sample requires compensation, compensator 204 can generate a compensated sample by offsetting the level of the digital sample with a first offset when the level of the digital sample is within a first threshold range 180, and a second offset when the level of the digital sample is within a second threshold range, 182, as previously discussed for step 164.

Delay circuit 206 is generally configured to delay the transmission of a, digital sample received from input 200 without changing the properties of the digital sample. The purpose of delay circuit 206 is to hold the digital sample for a predetermined period of time to ensure synchronization with compensator 204. Delay circuit 206 applies the delayed digital sample to output 208 through a delayed output 212 and electronic connection 214.

Output 208 is controlled by level detector 202 through control line 216. Output 208 is configured to receive the compensated samples from compensator 204 at input 218 and the delayed digital samples from delay circuit 206 at input 220. Level detector 202 selectively controls output 208 to output, to Viterbi detector 154, a compensated sample of a digital sample when the digital sample requires compensation or the digital sample when the digital sample does not require compensation. As a result, asymmetric correction block 158 can provide Viterbi detector 154 with compensated and non-compensated digital samples of asymmetric read signal V(t) such that the digital samples more closely resemble digital samples of a symmetric read signal V(t).

In summary, one embodiment of the present invention is directed to a method of correcting digital samples of an asymmetric read signal V(t) in a read channel 144 of a disc drive 110. In accordance with this embodiment, a digital sample of the asymmetric read signal is read and a determination is made as to whether the digital sample requires compensation. If the digital sample requires compensation, a compensated sample can be generated. Finally, either the compensated sample or the digital sample can be outputted to a Viterbi detector 154 of the read channel 144.

Another embodiment of the present invention is directed to an asymmetry correction block 158 that is capable of implementing the above-mentioned method. One embodiment of the asymmetry correction block includes an input 200, a level detector 202, a compensator 204, and an output 208. The input receives a digital sample of the asymmetric read signal V(t) and provides the digital sample to level detector 202 and compensator 204. Level detector 202 determines whether the digital sample requires compensation. If it is determined that the digital sample requires compensation, compensator 204 generates a compensated sample. The output 208 is configured to selectively output either the digital sample or the compensated sample. In one embodiment of the invention, the asymmetry correction block 158 further includes a delay circuit 206. Delay circuit 206 receives the digital sample from input 200 and delays providing it to output 208 to ensure proper synchronization with compensator 204.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed.

What is claimed is:

1. A method for correcting an asymmetric signal having a polarity that requires compensation comprising steps of:
   (a) reading a digital sample of the asymmetric signal having a level and a polarity;
   (b) generating a compensated sample at least when the polarity of the digital sample corresponds to the polarity of the signal that requires compensation and the level of the digital sample is not within a zero threshold range by offsetting the level of the digital sample by either:
      (b) (1) a first offset value when the level of the digital sample is within a first threshold range; or
      (b) (2) a second offset value when the level of the digital sample is within a second threshold range; and
   (c) outputting either the compensated sample or the digital sample.

2. The method of claim 1, wherein the generating step (b) generates a compensated sample even though the digital sample does not require compensation.

3. The method of claim 1, wherein the first threshold range covers a range of levels extending from a boundary of the zero threshold range to a boundary of the second threshold range.

4. The method of claim 1, wherein:
   the signal has a larger peak amplitude and a smaller peak amplitude;
   the smaller peak amplitude corresponds to the polarity that requires compensation; and
   the level of the digital sample is increased by the first or second offset value.

5. The method of claim 1, wherein:
   the signal has a larger peak amplitude and a smaller peak amplitude;
   the larger peak amplitude corresponds to the polarity that requires compensation; and
   the level of the digital sample is decreased by the first or second offset value.

6. A method for correcting an asymmetric signal having a larger peak amplitude corresponding to a first polarity and a smaller peak amplitude corresponding to a second polarity, the method comprising steps of:
   (a) reading a plurality of digital samples of the asymmetric signal each having a level and a polarity;
   (b) generating compensated samples for each digital sample having a level that is outside of a zero threshold range by either:
      (b) (1) decreasing the level of each digital sample corresponding to the first polarity by a first offset value; or
      (b) (2) increasing the level of each digital sample corresponding to the second polarity by a second offset value; and
   (c) selectively outputting the compensated and digital samples.

7. An asymmetry correction block of a digital communication channel for compensating digital samples of an asymmetric signal, the asymmetric signal having a polarity that requires compensation, the asymmetry correction block comprising:
   an input for receiving a digital sample of the signal, the digital sample having a level and a polarity;
   a level detector electrically coupled to the input and configured to determine whether the digital sample requires compensation, wherein the digital sample requires compensation when the polarity of the digital sample corresponds to the polarity of the signal that requires compensation and the level of the digital sample is not within a zero threshold range;
   a compensator electrically coupled to the level detector and configured to generate a compensated sample when the digital sample requires compensation by offsetting the level of the digital sample by either a first offset value when the level of the digital sample is within a first threshold range, or a second offset value when the level of the digital sample is within a second threshold range; and
   an output electrically coupled to the level detector and configured to selectively output one of the compensated sample and the digital sample.

8. The asymmetry correction block of claim 7, wherein the first threshold range covers a range of levels extending from a boundary of the zero threshold range to a boundary of the second threshold range.

9. The asymmetry correction block of claim 7, further comprising a delay circuit configured to receive the digital sample from the input, hold the digital sample for a predetermined period of time, and transmit the digital sample through a delayed output, wherein the output receives the digital sample from the delay circuit.

10. A digital communication channel of a disc drive capable of compensating asymmetric signals having a polarity that requires compensation, the digital communication channel comprising:
   a variable gain amplifier configured to receive an analog signal and amplify the analog signal;
   a filter stage configured to receive an analog signal from the variable gain amplifier and to remove high frequency components of the analog signal;
   an analog-to-digital (A/D) converter configured to receive the analog signal from the filter stage and to convert the analog signal into discrete digital samples;
   an equalizer configured to receive the digital samples from the A/D converter and to perform pulse shaping on the digital samples, wherein each of the digital samples has a level and a polarity;
   an asymmetry correction block for correcting the asymmetry of the signal by selectively compensating the digital samples, the asymmetry correction block comprising:

an input for receiving a digital sample;

a level detector electrically coupled to the input and configured to determine whether the digital sample requires compensation, wherein the digital sample requires compensation when the polarity of the digital sample corresponds to the polarity of the signal that requires compensation and the level of the digital sample is not within a zero threshold range;

a compensator electrically coupled to the level detector and configured to generate a compensated sample when the digital sample requires compensation by offsetting the level of the digital sample by either a first offset value when the level of the digital sample is within a first threshold range, or a second offset value when the level of the digital sample is within a second threshold range; and an output electrically coupled to the level detector and configured to selectively output one of the compensated sample and the digital sample; and a detector coupled to the output and configured to receive the samples and to convert the samples into code words; and a decoder configured to receive the code words from the detector and to decode the code words into recovered data.

11. The digital communication channel of claim 10, wherein the first threshold range covers a range of levels extending from a boundary of the zero threshold range to a boundary of the second threshold range.

12. The digital communication channel of claim 10, wherein:

the signal has a larger peak amplitude and a smaller peak amplitude;

the smaller peak amplitude corresponds to the polarity that requires compensation; and the level of the digital sample is increased by the first or second offset value to generate the compensated sample.

13. The digital communication channel of claim 10, wherein:

the signal has a larger peak amplitude and a smaller peak amplitude;

the larger peak amplitude corresponds to the polarity that requires compensation; and the level of the digital sample is decreased by the first or second offset value to generate the compensated sample.

14. The digital communication channel of claim 10, further comprising a delay circuit configured to receive the digital sample from the input, hold the digital sample for a predetermined period of time, and transmit the digital sample, through a delayed output, wherein the output receives the digital sample from the delay circuit.

15. A digital communication channel, comprising:

means for digitizing an asymmetric signal into digital samples having a level and a polarity; and means for compensating the digital samples having a level that is outside of a zero threshold range by offsetting the level of the digital sample by either a first offset value when the level of the digital sample is within a first threshold range, or a second offset value when the level of the digital sample is within second threshold range such that the asymmetry of the signal is reduced.

16. The method of claim 15, wherein the first threshold range covers a range of levels extending from a boundary of the zero threshold range to a boundary of the second threshold range.

* * * * *